(12) United States Patent
Hood et al.

(10) Patent No.: US 8,242,224 B2
(45) Date of Patent: Aug. 14, 2012

(54) POLYVINYLAMIDE POLYMERS CONTAINING POLYMERIZABLE FUNCTIONALITIES

(75) Inventors: David K. Hood, Basking Ridge, NJ (US); Osama M. Musa, Hillsborough, NJ (US)

(73) Assignee: ISP Investments Inc., Wilmington, DE (US)

( * ) Notice: Subject to any disclaimer, the term of this patent is extended or adjusted under 35 U.S.C. 154(b) by 154 days.

(21) Appl. No.: 12/698,583

(22) Filed: Feb. 2, 2010

(65) Prior Publication Data

US 2010/0190947 A1     Jul. 29, 2010

Related U.S. Application Data

(63) Continuation-in-part of application No. PCT/US2008/073344, filed on Aug. 15, 2008.

(60) Provisional application No. 61/153,124, filed on Feb. 17, 2009, provisional application No. 61/149,081, filed on Feb. 2, 2009, provisional application No. 60/955,947, filed on Aug. 15, 2007, provisional application No. 61/073,535, filed on Jun. 18, 2008.

(51) Int. Cl.
*C08F 12/28* (2006.01)
*C08F 12/22* (2006.01)

(52) U.S. Cl. .................................. 526/310; 526/264

(58) Field of Classification Search .................. 526/310, 526/264
See application file for complete search history.

(56) References Cited

U.S. PATENT DOCUMENTS

| | | | |
|---|---|---|---|
| 3,997,306 A | 12/1976 | Hedden | |
| 4,048,077 A | 9/1977 | Engelhardt et al. | |
| 4,070,348 A | 1/1978 | Kräemer et al. | |
| 4,070,532 A | 1/1978 | Hammer | |
| 4,409,105 A | 10/1983 | Hayashi et al. | |
| 4,737,544 A | 4/1988 | McCain et al. | |
| 4,806,449 A | 2/1989 | Hofmann et al. | |
| 4,989,607 A | 2/1991 | Keusch et al. | |
| 5,059,632 A | 10/1991 | Horn et al. | |
| 5,106,875 A | 4/1992 | Horn et al. | |
| 5,159,360 A * | 10/1992 | Stoy et al. ................. | 351/160 H |
| 5,362,830 A * | 11/1994 | Chuang et al. ............... | 526/263 |
| 5,571,860 A * | 11/1996 | Kukkala et al. .............. | 524/503 |
| 5,684,105 A | 11/1997 | Zhong et al. | |
| 6,242,133 B1 | 6/2001 | Kato et al. | |
| 6,277,498 B1 | 8/2001 | Endo et al. | |
| 6,590,050 B1 | 7/2003 | Bair et al. | |
| 6,716,992 B2 | 4/2004 | Musa | |
| 6,753,434 B1 | 6/2004 | Musa | |
| 7,008,979 B2 | 3/2006 | Schottman et al. | |
| 7,199,249 B2 | 4/2007 | Liu et al. | |
| 7,264,876 B2 | 9/2007 | Smalley et al. | |
| 7,300,022 B2 | 11/2007 | Muller | |
| 2004/0014903 A1 | 1/2004 | Musa | |
| 2007/0049651 A1 | 3/2007 | Watanabe | |
| 2007/0056900 A1 | 3/2007 | Mathauer et al. | |
| 2007/0212556 A1 | 9/2007 | Musa et al. | |
| 2008/0225099 A1 | 9/2008 | Cohen et al. | |

FOREIGN PATENT DOCUMENTS

| | | |
|---|---|---|
| EP | 0103184 | 3/1984 |
| EP | 0248395 | 12/1987 |
| EP | 0368217 | 5/1990 |
| EP | 0368218 | 5/1990 |
| EP | 0687719 | 12/1995 |
| EP | 1158009 | 11/2001 |
| WO | 02/053620 | 7/2002 |
| WO | 2005/076074 | 8/2005 |

OTHER PUBLICATIONS

Kao et al. ("UV Curable Bioadhesives: Copolymers of N-Vinyl Pyrrolidone", Journal of Biomedical Materials Research Part A, vol. 38, Issue 3, 191-196, Fall 1997).*

(Continued)

*Primary Examiner* — Ling Choi
*Assistant Examiner* — Chun-Cheng Wang
(74) *Attorney, Agent, or Firm* — William J. Davis; Thompson Hine LLP

(57) ABSTRACT

The present invention relates to a polymerizable polymer formed from an N-vinyl amide monomer and containing a polymerizable functionality. In one approach, a dual functional monomer may be employed. In the case where the dual functional monomer incorporates glycidyl methacrylate, a third polymerizable monomer is also included. In a second approach, a monomer with polymerizable functionality can be grafted onto a pre-existing, suitable N-vinyl amide co-polymeric material, yielding a co-polymer comprising a polymerizable functionality.

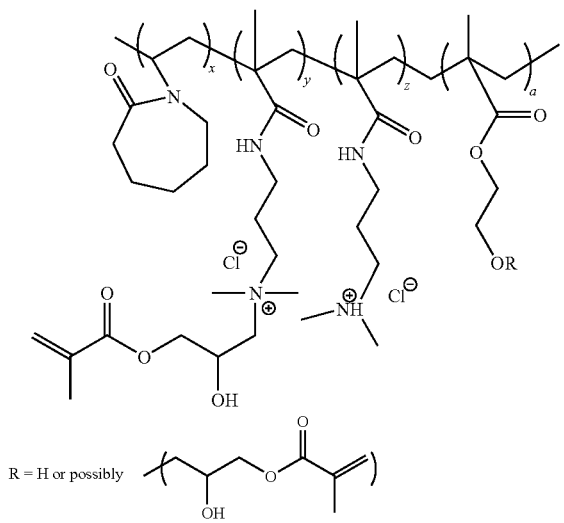

where $x+y+z+a=100$.

13 Claims, No Drawings

OTHER PUBLICATIONS

PCT, International Search Report, International Application No. PCT/US2008/073344 (mailed Oct. 30, 2008; published Feb. 19, 2009).

PCT, International Preliminary Report on Patentability, International Application No. PCT/US2008/073344 (Feb. 16, 2010).

O'Connell, M.J. et al., "Reversible water-solubilization of single-walled carbon nanotubes by polymer wrapping," *Chemical Physics Letters*, 342, pp. 265-271 (2001.

Qui, X. et al., "Copolymerization of *N*-Vinylcaprolactam and Glycidyl Methacrylate: Reactivity Ratio and Composition Control," *Journal of Polymer Science, Part A: Polymer Chemistry*, vol. 44, pp. 183-191 (2006).

Soundararajan, S. et al., "Glycidyl Methacrylate and *N*-Vinyl-2-pyrrolidone Copolymers: Synthesis, Characterization, and Reactivity Ratios," *Journal of Applied Polymer Science*, vol. 43, pp. 251-258 (1991).

* cited by examiner

POLYVINYLAMIDE POLYMERS CONTAINING POLYMERIZABLE FUNCTIONALITIES

CROSS REFERENCE TO RELATED APPLICATIONS

This application is a continuation-in-part of International Application No. PCT/US2008/073344, filed Aug. 15, 2008, which claims the benefit of U.S. Provisional Application Ser. No. 60/955,947, filed Aug. 15, 2007, and U.S. Provisional Application Ser. No. 61/073,535, filed Jun. 18, 2008; and this application also claims the benefit of U.S. Provisional Application Ser. No. 61/149,081, filed Feb. 2, 2009, and U.S. Provisional Application Ser. No. 61/153,124, filed Feb. 17, 2009. The entire contents of the related applications set forth herein are hereby incorporated by reference.

FIELD OF THE INVENTION

The present invention relates to polyvinylamides containing polymerizable functionalities.

BACKGROUND OF THE INVENTION

For many applications employing polymeric materials, cross-linking of the polymer is a critical and necessary step in preparing many commercially viable products. Historically, one approach to cross-linking a polymer has been to introduce a reactive chemical component, commonly referred to as a "cross-linking agent." Typical examples of cross-linking agents are melamines, formaldehyde, chromates, polyfunctional silanes, zirconates, borates, polyfunctional acids and polyfunctional amines.

More recently, polymers have been developed which do not require the addition of a cross-linking agent. Many of these polymers employ glycidyl or amine functionalities to enable the polymer to form covalent bonds to itself or other functional materials. This approach is advantageous because the product formulation is simple and the resultant product is a commercially viable polymeric material. For example, crosslinked polymers of N-vinyl amides, such as N-vinyl pyrrolidone (VP or HPVP) and N-vinyl caprolactam (VCL), can be made by the addition of a glycidyl methacrylate (GMA) functionality. See, B. S. R. Reddy et. al. in the Journal of Applied Polymer Science, Vol. 43, 251-258 (1991) and S. A. Sukhishvili et. al. in the Journal of Polymer Science: Part A: Polymer Chemistry, Vol. 44, 183-191 (2006).

Also, EP 0 103 184 assigned to Diamond Shamrock discloses hydrogel terpolymers of GMA (50%) and VP(40%) and hydroxyethylmethacrylate (HEMA) (10%). Finally, US 2007/0056900 assigned to BASF discloses polymers comprising 60-99% by weight of a least one N-vinyl amide (e.g., VP, VCL) and 1-40% by weight of at least one monomer selected from, for example, GMA, HEMA, aminostyrene compounds, and imidazoles.

Given the many uses for cross-linked polymeric materials, there is a constant need for a next generation cross-linkable polymers. The present invention is directed to polymers containing polymerizable functionalities.

SUMMARY OF THE INVENTION

In accordance with one aspect of the present invention, a polymer comprising an N-vinyl amide monomer and a dual functional monomer is disclosed. In the case where the dual functional monomer incorporates a glycidyl acrylate, a third polymerizable monomer is also included. In a second approach, a monomer with polymerizable functionality can be grafted onto a pre-existing, suitable N-vinyl amide co-polymeric material, yielding a co-polymer comprising a polymerizable functionality. The polymer can be varied in charge.

DETAILED DESCRIPTION OF THE INVENTION

The present invention relates to a polymer formed from an N-vinyl amide monomer and containing a polymerizable functionality. In one approach, a dual functional monomer may be employed. In the case where the dual functional monomer incorporates glycidyl methacrylate, a third polymerizable monomer is also included. In a second approach, a monomer with polymerizable functionality can be grafted onto a pre-existing, suitable N-vinyl amide co-polymer containing moieties suitable for grafting, yielding a polymeric material comprising a polymerizable functionality.

The term "non-hydrogel polymer" refers to any polymer composition that is capable of forming a substantially solid mass, and that is not comprised of a hydrogel polymer. Non-hydrogel polymers are capable of being solubilized in a solvent and/or monomer and consequently it is possible to measure the molecular weight, via gel permeation chromatography for example, of non-hydrogel polymers. Throughout this description, the term "hydrogel" denotes a polymeric material that is capable of absorbing a solvent, such as water, up to and including its equilibrium content but is incapable of demonstrating a molecular weight, via gel permeation chromatography for example.

The term "polymerizable functionality" refers to a pendant group or bond capable of being polymerized. The term "reactive functionality" refers to functional groups or bonds capable of reacting with another group or bond. Polymerizable functionalities are a subset of reactive functionalities.

The term "N-vinyl amide monomer" refers to monomers including, but not limited to, N-vinyl pyrrolidone, N-vinyl valerolactam, N-vinyl caprolactam, and N-vinyl formamide. N-Vinyl pyrrolidone, N-vinyl formamide, and N-vinyl caprolactam are preferred.

The term "dual functional monomer" refers to monomers having the structure

Q-R-E where Q is an oxirane, oxetane, aziridine, oxazoline, or benzoxazine, E is a polymerizable functionality containing a carbon-carbon double bond and R is an aliphatic and/or aromatic moiety with or without a heteroatom. It is possible to incorporate the monomer into a polymer yielding a free carbon-carbon double bond and/or a free, ionically polymerizable functionality.

In accordance with particular aspects of the present invention the dual functional monomer may be a monomer having the structure

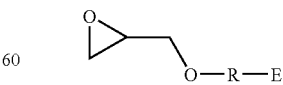

where E is a polymerizable functionality containing a carbon-carbon double bond and R is an aliphatic and/or aromatic moiety with or without a heteroatom. It is possible to incorporate the monomer into a polymer yielding a free, polymerizable double bond and/or free, polymerizable oxirane ring.

The term "glycidyl acrylates" refers to alkyl acrylate monomers having a glycidyl group attached to an alkyl acrylate monomer. Further, the alkyl group can be, but not limited to, a C1-C12 carbon atom. Non limiting examples of suitable alkyl acrylate monomers are the glycidyl (alkyl)acrylates such as, GMA, glycidyl ethacrylate, glycidyl butylacrylate, and glycidyl dodecyl acrylate. Preferred glycidyl (alkyl)acrylates useful in the practice of the present invention include GMA, glycidylethacrylate, glycidylbutylacrylate and glycidyldodecylacrylate. GMA is a particularly useful monomer.

The term "third polymerizable monomer" refers to additional monomers that may be present in the composition including, but not limited to HEMA, vinyl acetate (VA), ethyl acrylate, methyl acrylate, methylmethacrylate, dimethylaminoethyl methacrylate (DMAEMA), dimethylaminopropyl methacrylamide (DMAPMA), acrylamide, methacrylamide, acrylonitrile, cyanoacrylates, ethylene, styrene, maleic anhydride (MAN), acrylic acid (AA), sodium vinylsulfonate, vinylene carbonate, vinyl chloride, 4-vinyl aniline, vinylpyridine, trimethylvinylsilane, vinyl propionate, crotonic acid, polyfunctional acrylate, polyfunctional allyl ether, vinyl imidazole, N-vinyl imidazole, vinyl carbonate and allyl acetate and allyl alcohol. Particularly useful third monomers useful in the practice of certain aspects of the present invention include HEMA, VA, crotonic acid, acrylamide, and MAN. HEMA, MAN, and VA are particularly useful. The third polymerizable monomer can be selected to yield a polymer varied in charge, resulting in an anionic, non-ionic, cationic, or zwitterionic polymeric material.

The term "grafting" refers to the incorporation of a specific functionality, specifically a polymerizable functionality, by chemically attaching said functionality to a pre-existing polymeric material. Desirable reactive functionalities suitable for grafting include, but are not limited to, —$CO_2H$, —OH, -amine, nitrile, thiol, —SH, epoxy, oxetane, aziridine, isocyanate, oxazoline, or benzoxazine and combinations thereof. These moieties can be reacted with suitable graft functional monomers, or mixtures of said monomers, such as —$CO_2H$, —OH, -amine, nitrile, thiol, —SH, epoxy, oxetane, aziridine, isocyanate, oxazoline, or benzoxazine and combinations thereof to yield polymerizable polymers.

In accordance with one aspect of the present invention, a polymer comprising a N-vinyl amide monomer and a dual functional monomer is disclosed. The polymer comprises:
 (a) at least one N-vinyl amide monomer; and
 (b) at least one dual functional monomer having the structure

Q-R-E where Q is an oxirane, oxetane, aziridine, oxazoline, or benzoxazine, E is a polymerizable functionality containing a carbon-carbon double bond and R is aliphatic and/or aromatic moiety with or without a heteroatom. It is possible to incorporate the monomer into a polymer yielding a free carbon-carbon double bond and/or a free, ionically polymerizable functionality.

In the case where the dual functional monomer comprises glycidyl acrylate, a third polymerizable monomer is also present in the composition.

The polyvinyl amide containing polymerizable functionality of the present invention can be prepared by techniques known to those ordinarily skilled in the art such as bulk, solution, suspension and emulsion polymerization. Further, those ordinarily skilled in the art understand that the monomers used in preparing the polymer have functional groups which can be preferentially reacted to create a specific polymer for a specific application. Furthermore, it should be understood that reference to a polymer comprising certain monomers refers to the polymer formed as a reaction product of the specified monomers.

Specific dual functional monomers useful in accordance with the present invention include, without limitation, allyl glycidyl ether ([(2-propenyloxy)methyl]-oxirane), butadiene monoxide, 2-(1-aziridinyl)ethyl methacrylate, vinyl cyclohexene monoxide, 4-vinyl-1-cyclohexene-1,2-epoxide, 2-Isopropenyl-2-oxazoline, 2-isocyanatoethyl methacrylate, 1,3-diallyl-5-glycidylisocyanurate, glycidyl N-(3-isopropenyl dimethylbenzyl)carbamate, 3-N-(6-propyl vinyl ether) benzoxazine, and 2-(3-methyl-3-oxetanemethoxy)ethyl vinyl ether. More than one dual functional monomer may be used.

Specific graft functional monomers useful in accordance with the present invention include, without limitation, dimethylaminoethyl methacrylate, dimethylaminopropylmethacrylamide, maleic anhydride, acrylic acid, vinyl imidazole, 4-vinyl aniline, trimethylvinylsilane, crotonic acid, vinyl sulfone, allyl glycidyl ether ([(2-propenyloxy)methyl]-oxirane), butadiene monoxide, 2-(1-aziridinyl)ethyl methacrylate, vinyl cyclohexene monoxide, 4-vinyl-1-cyclohexene-1,2-epoxide, 2-Isopropenyl-2-oxazoline, 2-isocyanatoethyl methacrylate, 1,3-diallyl-5-glycidylisocyanurate, glycidyl N-(3-isopropenyl dimethylbenzyl)carbamate, 3-N-(6-propyl vinyl ether) benzoxazine, epichlorohydrin, and 2-(3-methyl-3-oxetanemethoxy)ethyl vinyl ether, and vinyl sulfonic acid.

Polymers of this invention can be blended with reactive monomers. Suitable classes of reactive monomers include, but are not limited to, epoxies, oxetanes, aziridines, oxazolines, benzoxazines, acrylates, acetates, maleimides, maleates, fumarates, styreneics, maleic anhydrides, vinyl amides, vinyl ethers, phenolics, cyanate esters, and the like.

Polymers in accordance with certain aspects of the present invention may be non-ionic, anionic, or cationic. Furthermore, polymers or compositions containing the polymers may be in powder, solid, liquid or solution form. The polymers in accordance with certain embodiments are non-hydrogel polymers. Compositions comprising the polymer may be curable via UV radiation, electron beam, or gamma irradiation. The polymers may be utilized in the formulation of aqueous, hydrophilic, UV curable coatings or in 100% solid, UV curable coatings. Compositions comprising the polymer may be thermally and/or cationically curable or thermally and/or anionically curable. Polymer compositions may be free radically curable. The polymers or compositions containing the polymers may be thermoplastic polymers that can be produced in either liquid or powder form. Moreover, the polymers described herein or compositions containing the polymers may be suitable for extrusion and capable of forming extruded plastics containing the polymers. The polymers may be components of a UV and/or thermally curable conductive hydrogel. Polymers may also be used in the preparation of membranes and print receptive coatings. Other uses in addition to those set forth above are not particularly limited and can readily be determined by one of ordinary skill in the art. Compositions can be produced exhibiting a combination of the attributes set forth herein.

The practice of the present invention is illustrated by the following non-limiting examples:

EXAMPLE 1

A 1.0 liter three neck, round bottom flask is fitted with anchor type agitator, thermocouple, one addition funnel, and nitrogen purging line. The flask is charged with 80 g of DI Water, 27 g of Ethanol SDA 40B, 80 g of VCL and Ethanol. The system is purged three times with nitrogen and then nitrogen is blanketing the system during the reaction. The flask is heated to 80° C., during which the addition funnel is charged with 15 g of DMAPMA, 5 g of HEMA, and mixed with 107.5 g of DI Water. At 80° C., a 0.208 g injection of Vazo-67 is added to the flask by first mixing the initiator with 1.1 g of Ethanol SDA 40B. After the initiator has been added, the drop-wise continuous addition of DMAPMA/HEMA/Water is started. Two more equivalent additions of initiator are added at 30 and 60 minute intervals. After the DMAPMA/HEMA/Water addition is completed, add the 88 g of DI Water for dilution. The final pH should be in range of 6.5 to 7.5 upon adjustment with hydrochloric acid. After pH adjustment, the ethanol is distilled off and replaced with DI water, while using Vacuum. After ethanol removal is completed, 3 g of GMA are added to the mixture and allowed to heat at 60° C. for one hour. The resulting product exhibits a viscosity of 100 cPs at 15% solids in water and a weight average molecular weight of 115,000 g/mol as determined by GPC.

A representative structure for the reaction product is presented below, wherein $x+y+z+a=100$:

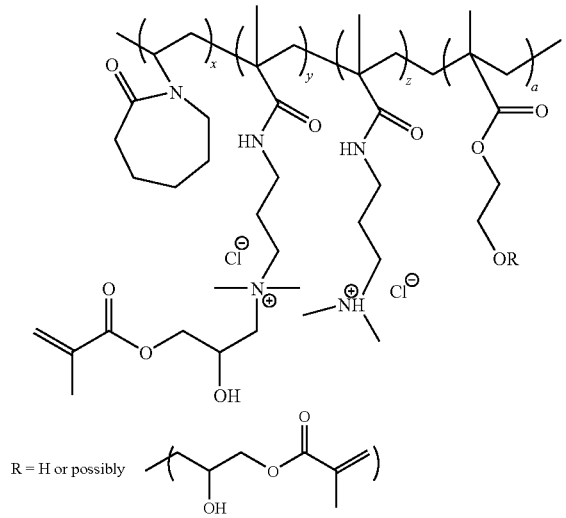

EXAMPLE 2

A 300 mL glass flask is fitted with an overhead agitator and thermocouple. The flask is charged with 10 g of VP/AA/Lauryl methacrylate terpolymer (Styleze 2000) and 90 g of 50/50 water and ethanol blend. The pH is adjusted to 6 to 7 with ammonium hydroxide. The system is purged three times with nitrogen and then nitrogen is blanketing the system during the reaction. The flask is heated to 60° C. Upon achieving temperature, 1.2 g of GMA is added drop-wise. The mixture and allowed to heat at 60° C. for one hour. The polymer solution is cooled to room temperature and placed in a glass tray overnight, enabling the evaporation of water and ethanol. A representative structure for the reaction product is presented below, wherein $x+y+z+a=100$:

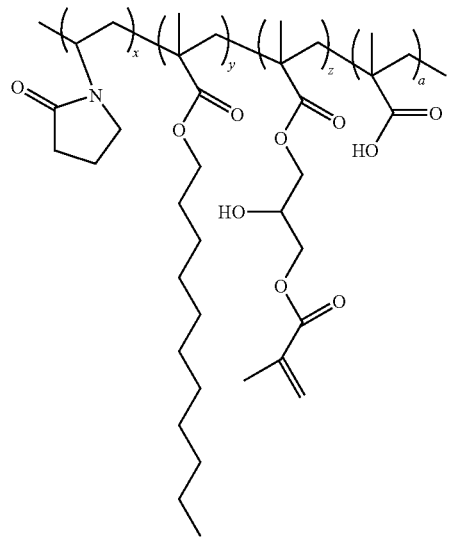

EXAMPLE 3

Prepare a two monomer/solvent blends. The heal is a blend of 10 g VP, 4 g GMA, and 80 g acetone. Mix thoroughly. Feed 1 is a blend of 30 g of VP, 10 g of VA, 4 g of GMA and 124 g of acetone. Mix thoroughly. To a 500 mL glass reaction vessel, equipped with a magnetic agitator, an addition funnel, and a chilled condenser, charge the heal and 5 g of Feed 1. Charge the remaining Feed 1 into the addition funnel. Commence purging of the reaction vessel by continuously with nitrogen. Begin heating to reflux, approximately ~57° C. In another separate vessel, prepare a mixture of 0.40 g of 2,2'-azobis(2,4-dimethylpentanenitrile) (VAZO 52) and 4 g of acetone (Feed 2). When the reaction flask has reached reflux temperature, charge 1 g of Feed 2 into the reaction vessel. Then commence a continuous, drop-wise addition of Feed 1 over a period of three hours. After one hour, charge 1 g of Feed 2 into the reaction vessel. Repeat this Feed 2 addition for the next two hours. At the completion of Feed 2 additions, allow one hour to elapse, charge the reaction vessel with another addition of initiator, charging 0.1 g of t-butylperoxy pivalate (Lupersol 11). The reaction vessel is allowed to heat at reflux an additional 1 hour, followed by another 0.2 g addition of Lupersol 11. Note that during the initiator shots, additional acetone was added to replace any that had volatilized. At the end of another one hour hold, the reaction vessel was cooled to room temperature. A representative structure for the reaction is presented below, wherein $x+y+z=100$:

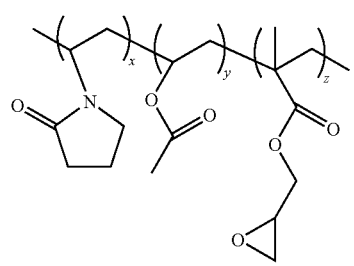

To demonstrate the functional utility of this reaction product as a reactive rheology modification agent, 1 g of ViviPrint 300 (HEMA/DMAPMA polymer) was diluted with 1 g of de-ionized water. This is a low viscosity, free flowing solution. To this solution, 1 g of the reaction product was added and mixed thoroughly. A quick heating of the sample to ~80° C. followed by cooling to room temperature formed a rigid, turbid gel, that is incapable of free flow.

It is envisioned that other functional polymers, such as polyamines, carboxylated polymers, hydroxylated polymers, carboxylated styrene/butadienes, carboxylated acrylates, amine functional acrylates and latexes, and the like will be suitable for reacting with glycidyl functional materials such as this example.

EXAMPLE 4

Feed 1 is 70 g of HPVP and 10 g of GMA is prepared for pumping. Feed 2 is 10 g of VA is prepared for pumping. Put 230 g of acetone into the reactor. Commence purging of the reaction vessel with nitrogen. Heat the flask containing acetone to reflux, approximately ~55° C. In another separate vessel, prepare a mixture of 1 g of Lupersol 11 and 5 g of acetone. When the reaction flask has reached reflux temperature, begin feeding 1 and 2, drop-wise, into the reaction vessel. The VA should be about half the feed rate of the VP/GMA blend. After 10 minutes of monomer feed, add 1 g of the initiator solution into the reactor. Continue the drop-wise addition of Feed 1 and Feed 2 over a period of approximately two hours. While the monomers are feeding into the reactor, after 30 minutes, charge 1 g of the initiator solution into the reaction vessel. After 30 minutes charge 1 g of initiator solution into the reactor. After 30 minutes charge 1 g of initiator solution into the reactor. At the completion of the monomer feeds, charge the reaction vessel with a final 1 g addition of initiator solution. Hold for two hours. Then charge with 0.5 gram of Lupersol 11 hold for two hours. Add another 0.5 grams of Lupersol 11 and hold for 5 hours then cool. The resulting polymer has a weight average molecular weight of 38,000 g/mol as determined by GPC.

A representative structure for the reaction is presented below, wherein x+y+z=100:

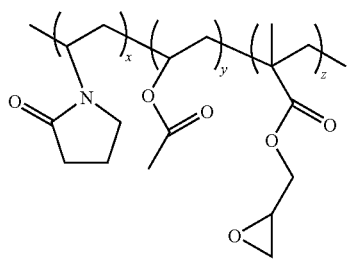

EXAMPLE 5

To 810 g of VCL/VP/DMAEMA terpolymer in ethanol (37% solids) is added 12 g of GMA. The solution is heated to 60° C. for one hour. A representative structure for the reaction product (VCL/VP/DMAEMA/GMA) is presented below, wherein w+x+y+z=100:

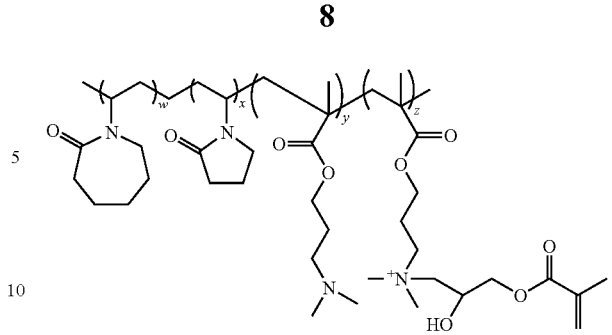

Examples 6-8 are prophetic examples of certain aspects of the present invention.

EXAMPLE 6

A 1.0 liter three neck, round bottom flask is fitted with an anchor type agitator, thermocouple, one addition funnel, a chilled condenser and nitrogen purging line. The flask is charged with 140 g of acetone and 40 g of VCL. The system is purged three times with nitrogen and then nitrogen is blanketing the system during the reaction. The flask is heated to reflux, ~57° C., during which the addition funnel is charged with 20 g of VA, 5 g of GMA and mixed with 100 g of acetone. At reflux, a 0.208 g injection of azobisisobutyronitrile is added to the flask by first mixing the initiator with 1.1 g of acetone. After the initiator has been added, the drop-wise continuous addition of VA is started. five more equivalent additions of initiator are added at 60 minute intervals. The product is cooled to room temperature.

EXAMPLE 7

120 g of MAN is dissolved in 455 g of toluene at 70° C. The solution is placed in an addition funnel. In a separate addition funnel, 30 g of GMA is added to 50 g of toluene. 170 g of VP and 335 g of toluene are charged into the reaction vessel. The system is purged with nitrogen. The temperature of the reaction vessel is raised to 55° C. and VAZO 5 g initiator is added. Then the drop-wise addition of the MAN and GMA commences and is completed after 2.5 hours. The system is allowed to agitate further for one hour. The precipitated polymer is filtered, re-slurried in heptane, and re-filtered. The polymer is allowed to air dry for 1 hour and is then vacuum dried at 35° C.

EXAMPLE 8

Prophetic

Feed 1 is 70 g of HPVP and 10 g of cyanoethyl acrylate (CEA) is prepared for pumping. Feed 2 is 10 g of GMA is prepared for pumping. Put 230 g of acetone into the reactor. Commence purging of the reaction vessel with nitrogen. Heat the flask containing acetone to reflux, approximately ~55° C. In another separate vessel, prepare a mixture of 1 g of Lupersol 11 and 5 g of acetone. When the reaction flask has reached reflux temperature, begin feeding 1 and 2, drop-wise, into the reaction vessel. The GMA should be about half the feed rate of the VP/CEA blend. After 10 minutes of monomer feed, add 1 g of the initiator solution into the reactor. Continue the drop-wise addition of Feed 1 and Feed 2 over a period of approximately two hours. While the monomers are feeding into the reactor, after 30 minutes, charge 1 g of the initiator solution into the reaction vessel. After 30 minutes charge 1 g of initiator solution into the reactor. After 30 minutes charge 1 g of initiator solution into the reactor. At the completion of the monomer feeds, charge the reaction vessel with a final 1 g addition of initiator solution. Hold for two hours. Then charge with 0.5 gram of Lupersol 11 hold for two hours. Add another 0.5 grams of Lupersol 11 and hold for 5 hours then cool. A representative structure for the reaction is presented below, wherein x+y+z=100:

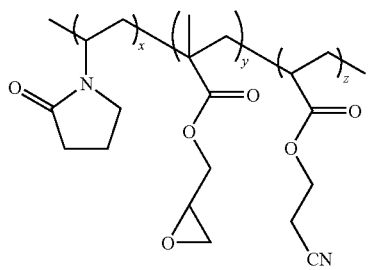

EXAMPLE 9

Prophetic

Feed 1 is 70 g of HPVP and 10 g of GMA is prepared for pumping. Feed 2 is 10 g of VA is prepared for pumping. Put 230 g of acetone into the reactor. Commence purging of the reaction vessel with nitrogen. Heat the flask containing acetone to reflux, approximately ~55° C. In another separate vessel, prepare a mixture of 1 g of Lupersol 11 and 5 g of acetone. When the reaction flask has reached reflux temperature, begin feeding 1 and 2, drop-wise, into the reaction vessel. The VA should be about half the feed rate of the VP/GMA blend. After 10 minutes of monomer feed, add 1 g of the initiator solution into the reactor. Continue the drop-wise addition of Feed 1 and Feed 2 over a period of approximately two hours. While the monomers are feeding into the reactor, after 30 minutes, charge 1 g of the initiator solution into the reaction vessel. After 30 minutes charge 1 g of initiator solution into the reactor. After 30 minutes charge 1 g of initiator solution into the reactor. At the completion of the monomer feeds, charge the reaction vessel with a final 1 g addition of initiator solution. Hold for two hours. Then charge with 0.5 gram of Lupersol 11 hold for two hours. Add another 0.5 grams of Lupersol 11 and hold for 5 hours. Add 2 g of DMAPMA and hold for 1 hour. Note that suitable catalysts for this step of the reaction are identified in Chapter 5 of the *Lee & Neville Epoxy Handbook*, the contents of which are hereby incorporated by reference. Cool the reactor. A representative structure for the reaction is presented below, wherein x+y+z+a=100:

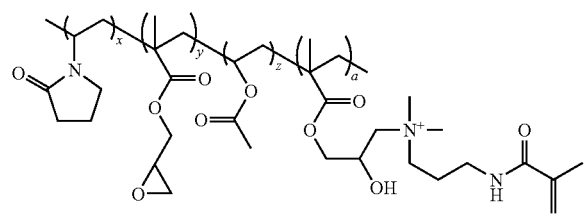

EXAMPLE 10

Prophetic

In a 500 ml round bottom flask, equipped with an overhead agitator, 50 g of VP/DMAEMA polymer (mw ~80,000 to 150,000 g/mol) powder is added to 200 g of vigorously agitating de-ionized water. The solution is allowed to mix until powder is completely solvated. The reaction vessel is heated to 60° C. To this polymer solution, 2.5 g of GMA is added drop-wise. The mixture is allowed to heat for one hour, then cooled to room temperature.

EXAMPLE 11

Prophetic

In a 500 ml round bottom flask, equipped with an overhead agitator, 50 g of VP/DMAEMA polymer (mw ~80,000 to 150,000 g/mol) powder is added to 200 g of vigorously agitating de-ionized water. The solution is allowed to mix until powder is completely solvated. The reaction vessel is heated to 60° C. To this polymer solution, 2.5 g of acrylic acid is added drop-wise. The mixture is allowed to heat for one hour, then cooled to room temperature.

EXAMPLE 12

Aqueous UV Curable Coating

| Product | Supplier | Mass (g) | Percent Solids | Dry Mass (g) | Wt % Dry Film Composition |
|---|---|---|---|---|---|
| Water | | 3.8 | | | |
| VCL/DMAPMA/ HEMA/GMA/HCL (Example 1) | | 3.8 | 30 | 1.14 | 70.6 |
| UCECOAT 6558, an aliphatic urethane acrylate solution in water | Cytec Surface Specialty | 0.5 | 50 | 0.25 | 15.5 |
| Ammonium Hydroxide | Aldrich | 1.45 | | | |
| HEMA | Aldrich | 0.2 | 100 | 0.2 | 12.4 |
| Darocur 1173, 2-hydroxy-2-methyl-1-phenyl-1-propanone | Ciba Specialty Chemicals | 0.025 | 100 | 0.025 | 0.16 |
| Total | | 9.775 | | 1.615 | 99 |

The example above provides a print receptive coating on a variety of substrates including polyester, vinyl, paper, canvas, Tyvec, polyolefins, and the like.

Other suitable components for aqueous based coatings of this invention include silicate and silica gels, free radical initiator, aluminates and aluminas, N-vinyl-2-pyrrolidone, N-vinyl-caprolactam, other N-vinyl amides, 1-vinyl imidazole, 4-acryloyl morpholine, polyvinyl pyrrolidone, polyvinyl alcohol, acetoacetylated polyvinyl alcohol, oxygen scavengers, styrene/acrylate latex, acrylic latexes, polyalkylene glycols, maleic anhydride-co-methyl vinyl ether polymers, polyalkylene imines, oxetanes, oxazolines, benzoxazines, polydi allyldialkylammonium chloride materials, starch, polyurethanes, acrylated oligomers of polyurethanes, acrylated glycidyl oligomers, polyfunctional acrylates, polyfunctional aziridines, clays, zirconates, titanates, calcium carbonates, talcs, cellulosics, vinyl ethers, epoxy based dispersions, anionic surfactants (i.e., sodium lauryl sulfate), non-ionic surfactants, cationic surfactants, silane or silicone based polymers, and anionic polyacrylates such as polyacrylic acid.

EXAMPLE 13

100% Solid UV Curable Coating

| Product | Supplier | Mass (g) | Percent Solids | Dry Mass (g) | Wt % Dry Film Composition |
|---|---|---|---|---|---|
| HEMA | Aldrich | 1.04 | 100 | 1.04 | 52 |
| VCL/DMAPMA/ HEMA/GMA/HCL (Example 1) | | 0.3 | 100 | 0.3 | 15.1 |
| DVE-3, Triethylene glycol divinyl ether | ISP | 0.2 | 100 | 0.15 | 7.5 |
| CN963B80, aliphatic polyester based urethane diacrylate oligomer blended with 20% SR238, hexane diol diacrylate (HDDA) | Sartomer | 0.43 | 100 | 0.43 | 21.6 |
| Darocur 1173 | Ciba Specialty Chemicals | 0.07 | 100 | 0.07 | 3.5 |
| Total | | 2.04 | | 1.99 | 99.7 |

The coating presented above is print receptive and adheres to flame treated polypropylene. Other substrates useful include polyester, vinyl, canvas, paper, Tyvec, saran, and the like.

Other suitable components for such coatings include monomers such as N-vinyl-2-pyrrolidone, N-vinyl-2-caprolactam, N-vinyl imidazole, 4-acryloyl morpholine, vinyl ethers, vinyl acetates, styrenics, (meth)acrylates, polyacrylates, surfactants (anionic, non-ionic, cationic), oxetanes, oxazolines, benzoxazines, ketones, isocyanate based monomers and polymers, acrylated oligomers, oxygen scavengers, moisture scavengers, free radical initiators, cationic initiators, sucrose benzoate(s), optical brighteners, inhibitors, hindered amine light stabilizers, UV absorbers, anti-oxidants, UV urethane oligomers, UV epoxy oligomers, UV unsaturated polyesters, UV glycolic (i.e. polyethylene glycol) acrylates, UV polyester oligomers, silica/silicates, carbon, carbon nano-tubes, silver, alumina/aluminates, zirconates, titanates, salts of alumina, salts of chromium, salts of barium, polyalkylene glycols, acrylated polyalkylene glycols, chlorinated polymers, sulfonated polymers and vinyl silanes.

Examples of suitable free radical initiators include 2,4,6-trimethylbenzoyl diphenyl phosphine oxide, ethyl(2,4,6-trimethylbenzoyl)phenyl phosphinate, 1-hydroxycylcohexyl phenyl ketone, 2-hydroxy-2-methyl-1-phenylpropanone, 2-isopropyl thioxanthone, 2,4-diethylthioxanthone, 2-methyl-1-[4-(methylthio)phenyl]-2-morpholinopropan-1-one, benzophenone, mixtures of benzophenones, 4-methyl benzophenone, 4-phenyl benzophenone, methyl-o-benzoylbenzoate, methylbenzoylformate, 2,2-dimethoxy-2-phenylacetophenone, 4-benzoyl-4'-methyldiphenylsulphide, 2,2'-bis-(2-chlorophenyl)-4,4',5,5'-tetraphenyl-1,2'-biimidazole, 4,4'-bis(diethylamino) benzophenone, 4,4',4''-methylidynetris(N,N-dimethyl aniline), and 2-hydroxy-2-methyl-1-(4-t-butyl) phenyl propanone.

Suitable amine synergists include 2-dimethylamino-ethyl benzoate, ethyl-4-(dimethylamino)benzoate, and 2-ethyl-hexyl-4-dimethylaminobenzoate.

Suitable polymeric photoinitiators include di-ester of carboxymethoxy-benzophenone and polytetramethyleneglycol 250, di-ester of carboxymethoxy thioanthone and polytetramethyleneglycol 250, polyethylene glycol(200)di(beta-(4 (acetylphenyl)piperizine))propionate, poly(ethylene glycol) bis(p-dimethylamino benzoate, and piparazino based aminoalkylphenone.

Examples of suitable mono-functional monomers include 2-phenoxy ethyl acrylate (PHEA), 2-(2-ethoxyethoxy)ethyl acrylate (EOEOEA), lauryl acrylate (LA), Stearyl acrylate (SA), isobornyl acrylate (IBOA), acrylic acid-2-ethylhexyl ester, acryloyl morpholine (ACMO), cyclic trimethylol-propane formal acrylate (CTFA), C8-C10 acrylate (ODA), iso-decyl acrylate (ISODA), lauryl methacrylate (LM), and stearyl methacrylate (SM).

Examples of suitable di-functional monomers include 1,6-hexanediol diacrylate (HDDA), dipropylene glycol diacrylate (DPGDA), tripropylene glycol diacrylate (TPGDA), 1,4-butanediol diacrylate (BDDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG(200)DA), polyethylene glycol (400) diacrylate (PEG(400)DA), polyethylene glycol (600) diacrylate (PEG(600)DA), ethoxylated bisphenol-A diacrylate (BPA2EODA), triethylene glycol diacrylate (TEGDA), triethylene glycol dimethacrylate (TEGDMA), diethylene glycol dimethacrylate (DEGDMA), and ethoxylated bisphenol-A dimethacrylate (BPA10EODMA).

Examples of suitable tri-functional monomers include trimethylolpropane triacrylate (TMPTA), pentaerythritol triacrylate (PET3A), ethoxylated tri-methylolpropane triacrylate (TMP3EOTA), propxylated tri-methylolpropane triacrylate (TMP3POTA), propoxylated glyceryl triacrylate (GPTA), trimethylolpropane trimethylacrylate (TMPTMA), and ethoxylated trimethylolpropane trimethacrylate (TMP3EOTMA). Examples of multifunctional monomers include pentaerythritol tetraacrylate (PETA) and dipentaerythritol hexaacrylate (DPHA).

Suitable solvents can be identified in the Industrial Solvents Handbook, 4ed. edited by E. W. Flick (Noyes Daya Corp, Park Ridge, N.J., 1991). Additional insight to solvent selection is also available in the Polymer Handbook, 4ed. edited by J. Brandrup, E. H. Immergut, and E. A. Grulke (John Wiley, New York, 1999). In the Polymer Handbook, and of particular utility, is *Solubility Parameters Values* by E. A. Grulke. These references are understood to be incorporated in their entirety.

All of the examples provided herein are understood to be non-limiting.

EXAMPLE 14

Hydrophilic Additive for Membranes

Employing the teachings of U.S. Pat. No. 7,300,022 B2 (the contents of which are hereby incorporated by reference) as a guide for the production of flat sheet membranes, a dope solution was prepared using VP/VA/GMA.

| Product | Supplier | Mass (g) |
|---|---|---|
| UDEL PS 3500 LCD (polysulfone) | Solvay | 17.1 |
| LiCl, lithium chloride | Aldrich | 3.54 |
| VP/VA/GMA | | 2.73 |

-continued

| Product | Supplier | Mass (g) |
| --- | --- | --- |
| Gantrez AN-119, maleic anhydride-co-methyl vinyl ether polymer | ISP | 3.09 |
| NMP, N-methyl-2-pyrrolidone | ISP | 74.3 |
| Total | | 100.76 |

All ingredients were combined and allowed to mix. The dope solution was cast onto a glass plate using a glass rod and a membrane was cast and heated to 60° C. for 10 minutes. The coating was allowed to stand for 24 hours. The membrane was then immersed in a precipitation bath consisting of 45% PEG-200, 45% water, and 10% NMP. The membrane was immersed in the precipitation bath for 10 minutes or until the membrane release from the glass plate and readied for inspection. In another embodiment, PVDF (polyvinylidene fluoride polymer) is also suitable for use in forming a membrane.

EXAMPLE 15

Cationic UV Curable Coating
Employing the teachings of U.S. Pat. Application No 20070049651 A1 (the contents of which are hereby incorporated by reference) as a guide for the production of cationic UV curable coating, the following cationic ink resin base was designed:

| Product | Supplier | Mass (g) |
| --- | --- | --- |
| VP/VA/GMA (Example 4) | | 10 |
| Irgacure 250 | Ciba | 3.3 |
| 3,4-Epoxycyclohexylmethyl-3,4-epoxycyclohexane carboxylate | Aldrich | 34.3 |
| 3-ethyl-3-((ethyloxetane-3-yl)methoxy)methyl)oxetane | Toagosei | 31.7 |
| DVE-3 | ISP | 20.7 |
| Total | | 100 |

The resin base coating presented above is adhesive to polyester, exhibits some print receptive properties, good transparency, and gloss. Other substrates useful include polyolefins, vinyl, canvas, paper, Tyvec, saran, and the like. Other suitable components for such coatings are outlined in US 2007/0049651 A1, which is hereby incorporated by reference in its entirety.

Examples of suitable cationic photoinitiators include 10-biphenyl-4-yl-2-isopropyl-9H-thioanthen-10-ium hexafluorphospate, 4,4'-dimethyl-diphenyl iodonium hexafluorophospate, mixed triarylsulfonium hexafluorophosphate salts, and reaction products of polyol and 10-(2-carboxymethoxy)-biphenyl-4-yl-2-isopropyl-9-oxo-9H-thioxanthen-10-ium hexafluorophosphate. These examples are understood to be non-limiting. Examples of suitable co-reactants include vinyl ethers, organic oxirane and oxetane compounds, anhydrides, and other suitable co-reactants as outlined in the Handbook of Epoxy Resins by Lee and Neville (McGraw Hill, New York, 1967), which is hereby incorporated by reference in its entirety.

EXAMPLE 16

Anti-Fog Coating (prophetic)
Employing the teachings of U.S. Pat. No. 7,008,979 (the contents of which are hereby incorporated by reference) as a guide for the production of anti-fog coating, the following coating was designed:

| Product | Supplier | Mass (g) |
| --- | --- | --- |
| VCL/VP/DMAEMA/GMA in HEMA (25% Solids) (Example 5) | | 50 |
| CN963B80 | Sartomer | 50 |
| Darocur 1173 | Ciba | 3.5 |

Additional components, such as silica, wetting agents, or reactive diluents, for such coatings are outlined in U.S. Pat. No. 7,008,979 which is incorporated herein by reference in its entirety.

EXAMPLE 17

Thermally Curable Coating

| Ingredient | Mass (g) |
| --- | --- |
| VP/VA/GMA (Example 4) | 10 |
| EPON 828 | 22 |
| Diethylenetriamine (DETA) | 12 |
| 3,4-Epoxycyclohexylmethyl-3,4-epoxycyclohexane carboxylate | 56 |

This solution is drawn onto polyester film and placed into an air oven. Thermal curing can be accomplished in a temperature ranging from 130° C. to 200° C.

EXAMPLE 18

High Dielectric Constant Material (prophetic)
Employing the teachings of U.S. Pat. No. 7,264,876 and Chem. Phys. Let. 342 (2001) pp. 265-271 (the contents of which are hereby incorporated by reference) as a guide for the production of a high dielectric constant material comprised of wrapped single-wall carbon nanotubes (SWNT), the following formulation was designed:

SWNT materials would be dispersed in 1% sodium dodecyl sulfate (SDS) in water at a concentration of 50 mg/l by a combination of high-shear mixing and sufficient ultrasonication. In this example, enough VP/VA/GMA (Example 4) would be added to the mixture to result in a 1% solution by weight.

EXAMPLE 19

Stabilization Agent for 3-iodo-2-propynyl butyl carbamate (IPBC)
A solution of IPBC (20% by wt.) such as Fungitrol 420S was used as a control. Various polymers (described in the table) were added to the IPBC solution at 1.25% by wt. The samples were heated at 50° C. for 14 days and then exposed to UV light (Sun Q) for 3 days. The color of the solutions was evaluated using a Gardner color scale.

TABLE

| | Gardner Color | | |
| --- | --- | --- | --- |
| Formulation | Before exposure | After 50° C./14 days | After UV exposure |
| 20% IPBC solution (control) | <1 | 5 | 15 |
| Control + SA 630 | <1 | 3 | 9 |

| Formulation | Gardner Color | | |
|---|---|---|---|
| | Before exposure | After 50° C./14 days | After UV exposure |
| Control + VP/VA/GMA (Example 4), 3% GMA | <1 | 3 | 8 |
| Control + VP/VA/GMA, 6% GMA | <1 | <1 | 2 |

Polymer compositions disclosed herein may be used as stabilization agents for other iodine-based compounds.

EXAMPLE 20

Reactive Protective Colloidal Agent (prophetic)

Employing the teachings of U.S. Pat. No. 3,997,306 (the contents of which are hereby incorporated by reference), as a guide for the production of a microencapsulated particle, the following process was designed:

An electrophoretic medium internal phase (hydrocarbon containing titania and carbon black particles) would be emulsified in water in the presence of VP/VA/GMA (Example 4) for one hour with mechanical agitation to form a hydrocarbon-in-water emulsion. To this emulsion, there would be added dropwise an aqueous solution of polyethyleneimine (PEI), with continued mechanical agitation. The reaction would be allowed to proceed for 15 minutes after the addition of the PEI had been completed and the resultant capsules would be separated from the liquid by centrifugation.

EXAMPLE 21

Functional Silica Particle (prophetic)

Employing amine or carboxyl functionalized silica microspheres, referencing Technical Data Sheet 635 from Polysciences, the contents of which are hereby incorporated by reference, enables the covalent attachment of VP/VA/GMA (Example 4) to the surface of the silica particle. Note that suitable catalysts for this reaction are identified in Chapter 5 of the *Lee & Neville Epoxy Handbook*, the contents of which are hereby incorporated by reference. Representative chemical structures are below:

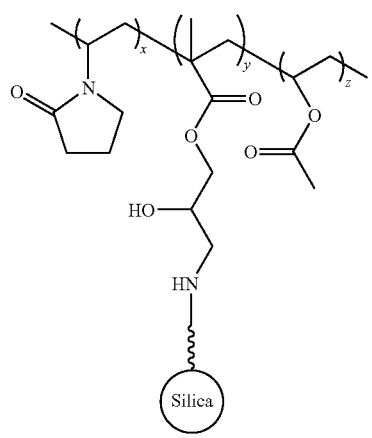

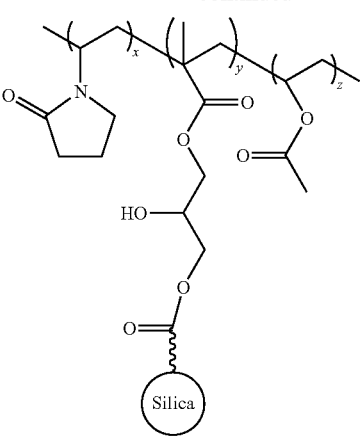

EXAMPLE 22

Fiber Sizing Agent Additive (prophetic)

Employing the teachings of U.S. Pat. No. 3,997,306 (the contents of which are hereby incorporated by reference), specifically Example 2 in '306, as a guide for the production of a sizing agent, the following formulation was designed:

| Ingredient | Grams/liter (wt %) |
|---|---|
| EPON 828 | 19.19 (1.92) |
| Reaction product of partial ester of maleic anhydride and monomethyl ether of polyethylene glycol reacted with 3,4 epoxycyclohexane carboxylate | 3.19 (0.32) |
| Industriol FC-180 | 2.38 (0.24) |
| Emulphor 719 | 2.38 (0.24) |
| Igepal CA-630 | 1.32 (0.13) |
| Alpha-methacrytoxypropyltriethoxysilane | 1.08 (0.11) |
| Alpha-aminopropyltriethoxysilane | 3.27 (0.33) |
| Emery 6717 | 0.55 (0.06) |
| VP/VA/GMA (Example 4) | 9.61 (0.96) |
| Water | Dilute to 1 liter |

EXAMPLE 23

Prophetic

Cementious Composition

Employing the teachings of U.S. Pat. No. 4,048,077 (the contents of which are hereby incorporated by reference), specifically Example 2 in '077, as a guide for the production of a cementious composition, in this case a drilling mud, the following formulation was designed:

To samples having a content of 4% of bentonite in water practically free from electrolytes and having a loss in water occurring without the use of additives according to API of 24 cm$^3$ 0.4% of carboxymethyl cellulose of medium viscosity (CMC-MV) and 0.1% of VP/VA/GMA (Example 4) would be added. The losses in water of the samples would be measured (a) according to API under normal conditions (20° C.) and (b) after a 15 hours' aging at 200° C.

EXAMPLE 24

Conductive Hydrogel Composition (prophetic)

Employing the teachings of U.S. Pat. No. 4,989,607 (the contents of which are hereby incorporated by reference) as a guide for the production of a conductive hydrogel composition, the following formulation was designed:

An aqueous mixture comprising 20 wt % VP/VA/GMA (Example 4), 1 wt % polyethylene oxide, 5% potassium chloride, 0.1% Dowicil 200, 0.02 wt % propylparaben, 0.15 wt % methylparaben, 0.02 wt % ethylparaben, and 0.007 wt % butylparaben. This extrudable, viscous mixture can be irradiated under a variety of dosage conditions.

EXAMPLE 25

Battery Binding Composition (prophetic)

Employing the teachings of U.S. Pat. No. 6,242,133 B1 (the contents of which are hereby incorporated by reference) as a guide for the production of a battery binding composition, the following formulation was designed:

In preparation of the electrode, 3.0 wt % aqueous solution of cobalt chloride ($CoCl_2$) as a transition metal salt based on the weight of the hydrogen absorbing alloy would be added to 3.0 wt % of polyvinyl alcohol (PVA) and 3.0 wt % of VP/VA/GMA (Example 4), based on the weight of the hydrogen absorbing ally, as a binder and the hydrogen absorbing alloy and binder would be mixed to prepare a paste. The paste would be coated and filled on both sides of a 0.8 mm thick punched metal nickel plate as an electrically conductive substrate to prepare an hydrogen absorbing alloy electrode.

EXAMPLE 26

UV Absorber Composition (prophetic)

In an amber or dark reaction flask equipped with agitation, 10 g of VP/VA/GMA (Example 4) terpolymer in water (20% solids) is added. Then 0.1 g of 4-aminobenzophenone is added. The solution is heated to 40° C. for one hour. Then 0.1 g of DMAPMA is added and the solution is heated at 40° C. for an additional hour. Note that suitable catalysts for these steps of the reaction are identified in Chapter 5 of the *Lee & Neville Epoxy Handbook*. A representative structure for the reaction product is presented below, wherein x+y+z+a=100:

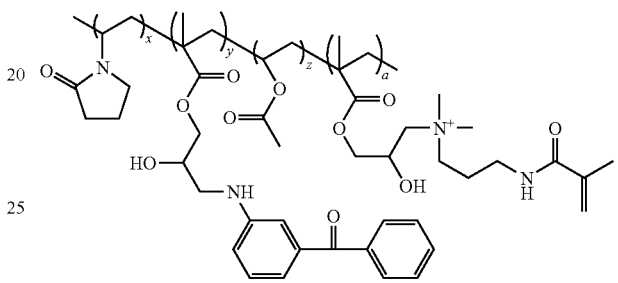

EXAMPLE 27

Photo-Initiator Composition (prophetic)

Using the teachings of WO 2005/076074 A2, a polymeric photo-initiator is constructed. In an amber or dark reaction flask equipped with agitation, 10 g of VP/VA/GMA (Example 4) terpolymer in acetone (20% solids) is added. Then 0.1 g of 2-benzyl-1-{4-[(2-hydroxyethyl)-acryloyl-amino]phenyl}-2-dimethylamino-1-butanone is added. The solution is heated at 40° C. for one hour. Then 0.1 g of DMAPMA is added. The solution is heated at 40° C. for one hour. Note that suitable catalysts for these steps of the reaction are identified in Chapter 5 of the *Lee & Neville Epoxy Handbook*. A representative structure for the reaction product is presented below, wherein a+x+y+z=100:

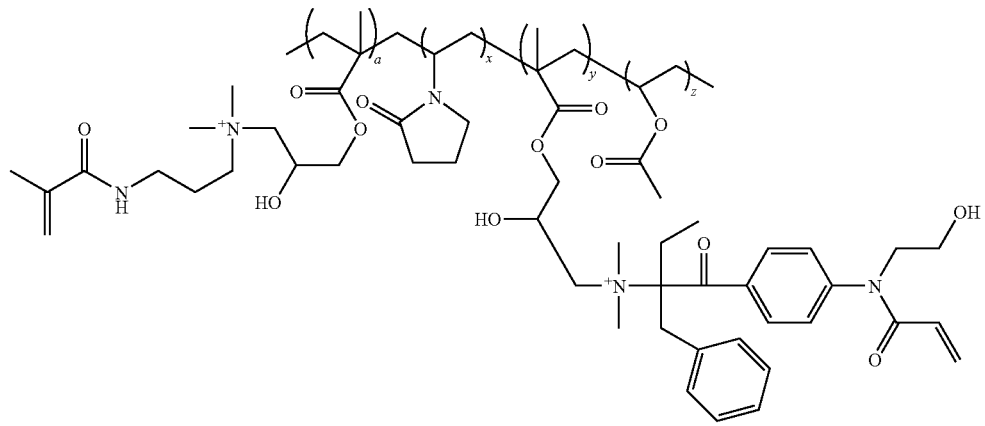

EXAMPLE 28

UV Curable Ink (prophetic)
Employing the teachings of U.S. Pat. Appl. No 2008/0225099 A1 (the contents of which are hereby incorporated by reference) as a guide for the production of a UV curable ink composition, the following formulation was designed:

| Ingredient | Wt % |
|---|---|
| Craynor 435, Polyether Acrylate Oligomer | 13 |
| SR 508, Dipropylene Glycol Diacrylate | 60.7 |
| SR 285, Tetrahydrofurfuryl acrylate | 10 |
| V-Caprolactam | 2.5 |
| VCL/VP/DMAEMA/GMA (Example 5) | 2 |
| IRG 379 | 2 |
| IRG 819 | 2 |
| Darocur ITX | 2 |
| Base 2621K | 7.9 |
| Hyper Blue #DW10629 | 0.1 |
| TEGO Rad 2200 N | 0.2 |

In an embodiment of the invention, the polymer is comprised of 19-80 wt % of a N-vinyl amide monomer, 1-25 wt % of an alkyl acrylate monomer having a functional group wherein the functional group is selected from a glycidyl group or mixtures thereof; and 1-80 wt % of a third polymerizable monomer.

In another embodiment of the invention, the polymer is comprised of 27-70 wt % of a N-vinyl amide monomer, 3-20 wt % of an alkyl acrylate monomer having a functional group wherein the functional group is selected from a glycidyl group or mixtures thereof, and 5-60 wt % of a third polymerizable monomer.

In a further embodiment of the invention, the polymer is comprised of 45-60 wt % of a N-vinyl amide monomer, 5-15 wt % of an alkyl acrylate monomer having a functional group wherein the functional group is selected from a glycidyl group or mixtures thereof, and 10-50 wt % of a third polymerizable monomer.

In a further embodiment of the invention, the polymer is comprised of 5-95 wt % of a N-vinyl amide monomer and 95-5 wt % dual functional monomer, provided the dual functional monomer is not a glycidyl acrylate.

In a further embodiment of the invention, the polymer is comprised of 20-80 wt % of a N-vinyl amide monomer and 80-20 wt % dual functional monomer, provided the dual functional monomer is not a glycidyl acrylate.

In a further embodiment of the invention, the polymer is comprised of 40-60 wt % of a N-vinyl amide monomer and 60-40 wt % dual functional monomer, provided the dual functional monomer is not a glycidyl acrylate.

In a further embodiment of the invention, the polymer is comprised of 10-90 wt % of a N-vinyl amide monomer and 85-9 wt % at least one co-monomer comprising a chemical moiety suitable for grafting and 1-5% of a graft functional monomer.

In a further embodiment of the invention, the polymer is comprised of 20-80 wt % of at least one N-vinyl amide monomer and 79-9 wt % at least one co-monomer comprising a chemical moiety suitable for grafting and 1-11% of at least one graft functional monomer.

Polymerizable polymers in accordance with certain aspects of the present invention may be grafted or include a photo-initiator composition, a UV absorber composition, etc. Compositions may include silver particles, carbon particles or iodine materials.

The polymers of the present invention are suitable for use in industrial, personal care, household, and pharmaceutical applications. Industrial uses include, but are not limited to, formulating inks, flocculation agents, surface modification agents, coatings, dispersants, hydrophilic enhancement agents for membranes, anti-fog coatings, protective colloidal agents, cross-linking agents, grease resistant films, fiber sizing agents, cementious compositions, bioadhesives, tablet coatings, battery binders, resinous photo-initiators, resinous UV absorbers, iodine stabilizers, conduction coatings and gels, reactive rheology modifying agents, coating flex agents, and non-migratory anti-static agents. Personal care and household applications include, but are not limited to, formulating cosmetics, hair care products, toiletries, laundry products and household cleaning products. Pharmaceutical applications include, but are not limited to, processing aids, medical stents, catheters and other medical device coatings, optical lenses, formulating drug delivery systems, and preparing tablet coatings.

What is claimed is:

1. A polymerizable polymer comprising: (a) at least one N-vinyl amide monomer; and (b) at least one dual functional monomer selected from the group consisting of butadiene monoxide, 2-(1-aziridinyl)ethyl methacrylate, vinyl cyclohexene monoxide, 4-vinyl-1-cyclohexene-1,2-epoxide, 2-Isopropenyl-2-oxazoline, 1,3-diallyl-5-glycidylisocyanurate, glycidyl N-(3-isopropenyl dimethylbenzyl)carbamate, 3-N-(6-propyl vinyl ether) benzoxazine, 2-(3-methyl-3-oxetanemethoxy)ethyl vinyl ether and combinations thereof, wherein said polymer is polymerizable.

2. A polymerizable polymer according to claim 1 further comprising an additional polymerizable functionality incorporated into the polymer via grafting.

3. A polymerizable polymer according to claim 1 comprising: (a) 5-95 weight % of a N-vinyl amide monomer; and (b) 95-5 weight % dual functional monomer, based on the total weight of the monomers.

4. A polymerizable polymer according to claim 1 comprising: (a) 20-80 weight % of a N-vinyl amide monomer; and (b) 80-20 weight % dual functional monomer, based on the total weight of the monomers.

5. A polymerizable polymer according to claim 1 comprising: (a) 40-60 weight % of a N-vinyl amide monomer; and (b) 60-40 weight % dual functional monomer, based on the total weight of the monomers.

6. A polymerizable polymer in accordance with claim 1 wherein said polymer comprises a pendant, polymerizable double bond.

7. A polymerizable polymer in accordance with claim 1 wherein said polymer comprises a pendant, polymerizable, heterocyclic ring.

8. A polymerizable polymer comprising: (a) at least one N-vinyl amide monomer; and (b) at least one dual functional monomer having the structure Q-R-E where Q is an oxirane, oxetane, aziridine, oxazoline, or benzoxazine, E is a polymerizable functionality containing a carbon-carbon double bond and R is aliphatic and/or aromatic moiety with or without a heteroatom, wherein said polymer is polymerizable and wherein said polymer is further grafted with a graft functional monomer yielding additional polymerizable functionality.

9. A polymerizable polymer according to claim 8 comprising: (a) 5-95 weight % of a N-vinyl amide monomer; and (b) 95-5 weight % dual functional monomer, based on the total weight of the monomers.

10. A polymerizable polymer according to claim 8 comprising: (a) 20-80 weight % of a N-vinyl amide monomer; and (b) 80-20 weight % dual functional monomer, based on the total weight of the monomers.

11. A polymerizable polymer according to claim 8 comprising: (a) 40-60 weight % of a N-vinyl amide monomer; and (b) 60-40 weight % dual functional monomer, based on the total weight of the monomers.

12. A polymerizable polymer according to claim 8 with the proviso that when the dual functional monomer is GMA, the N-vinyl amide monomer is neither VP nor VCL.

13. A polymerizable polymer according to claim 8 with the proviso that when the dual functional monomer is GMA, the N-vinyl amide monomer is neither VP nor VCL.

\* \* \* \* \*